United States Patent [19]

Jones et al.

[11] 4,116,400

[45] Sep. 26, 1978

[54] MOTORIZED FILM TAKE-UP CANISTER

[75] Inventors: Lamar J. Jones, Tate; Carl W. Williams, Woodstock, both of Ga.

[73] Assignee: Lockheed Corporation, Burbank, Calif.

[21] Appl. No.: 801,222

[22] Filed: May 27, 1977

[51] Int. Cl.² ...................... B65H 17/02; G03B 17/26

[52] U.S. Cl. .............................. 242/67.1 R; 242/71.1; 242/197; 352/72; 354/275

[58] Field of Search ...................... 242/197, 198, 71.2, 242/71.1, 71.7, 67.1 R, 55, 71, 71.3, 71.4, 179, 67.3 R, 55.53; 354/5, 18, 19, 314, 275; 355/90, 111; 352/72, 78 R

[56] References Cited

U.S. PATENT DOCUMENTS

| | | | |
|---|---|---|---|
| 872,970 | 12/1907 | Pink | 242/71.1 |
| 2,054,451 | 9/1936 | Skinner | 242/197 |
| 3,509,803 | 5/1970 | Delany | 354/18 |

*Primary Examiner*—George F. Mautz

*Attorney, Agent, or Firm*—A. L. Carter

[57] ABSTRACT

A motor drive arrangement for an exposed film take-up canister spool that permits a continuous take-up tension on the spool and yet permitting partial withdrawal of exposed film from the canister for additional exposure without interruption or reversal of the take-up drive.

2 Claims, 3 Drawing Figures

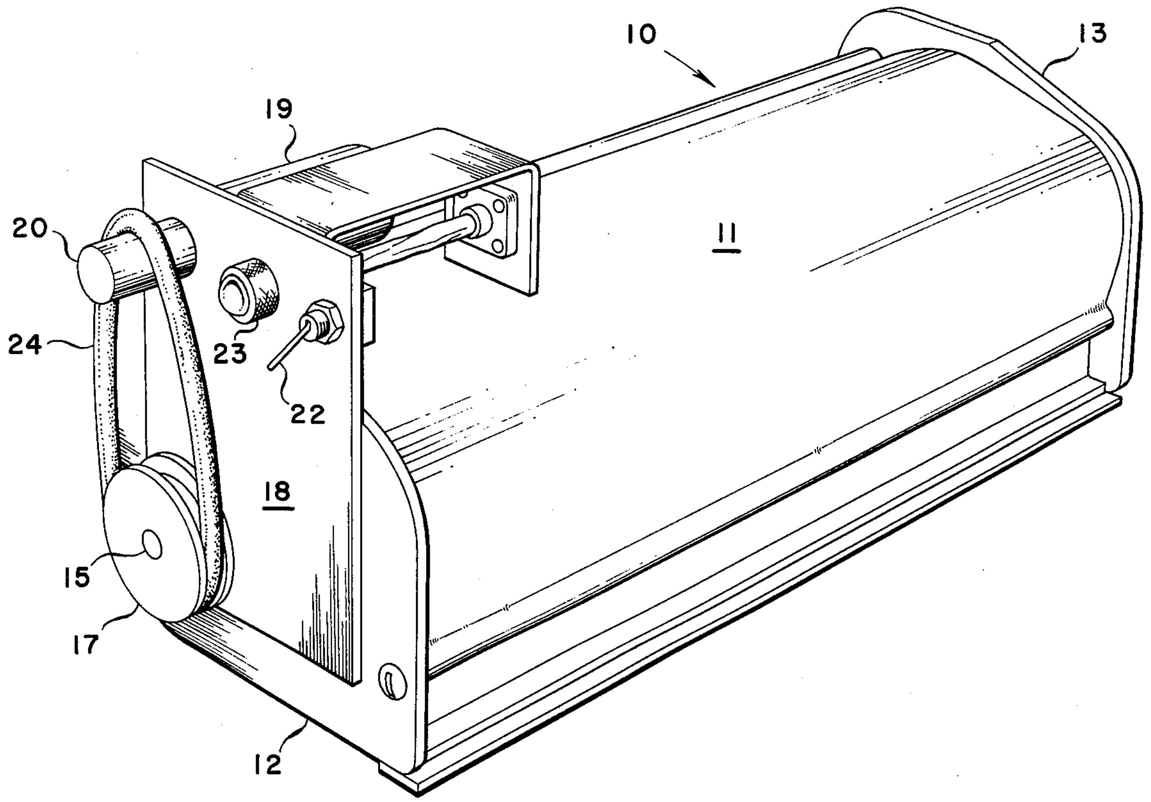
FIG. 1
FIG. 2
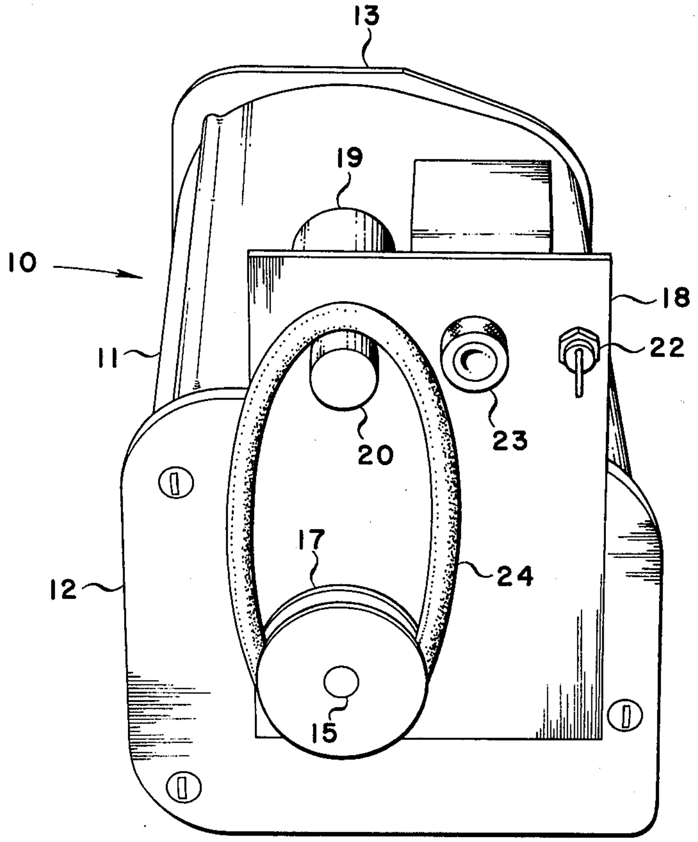

MOTORIZED FILM TAKE-UP CANISTER

This invention relates to a motorized sheet or web take-up canister, and more particularly a take-up canister for paper film exposed by a highspeed phototypesetting machine.

Some of the present day phototypesetting machines utilize a film or web take-up canister that is mounted to the machine in such manner that the exposed film discharge slot of the machine and the film intake slot of the canister are in alignment with each other; the canister being of a light impervious construction to avoid exposure of the film before development processing thereof. The feed of the film from the machine into the canister is controlled by drive means in the phototypesetting machine with the internal arrangement of the canister such that the film feed thereinto is forced into a coiled, roll shape by an arcuate spring member having one end secured to the interior wall of the canister and extending arcuately around and toward the axis of the canister. Because of the surface friction encountered between faying surfaces of the exposed film being force fed into the canister by the machine to form a tighter roll, coupled with the relative weak longitudinal compression load carrying ability of the film web, this type of prior art canister results in a substantially reduced capacity of exposed film that can be fed into the canister before film jamming of the machine film drive occurs. By such reduction of the canister capacity of exposed film, the time involved for phototypesetting machine operations is lengthened due to the necessity of replacement of less than full canisters with empty ones for the avoidance of film jamming.

An additional complication found with the prior art canister was that while the machine and canister were sized to handle 10 inch (25.4 cm.) wide film, the film jamming difficulties resulted in substantially one-half of the length of this width film being successfully fed into the canister as compared to 8 inch (20.3 cm.) wide film; i.e., a maximum of approximately 5 to 6 linear feet (1.5 to 1.8 m.) for the 10 inch (25.4 cm.) wide film as compared to approximately 10 to 12 linear feet (3.05 to 3.7 m.) for the 8 inch (20.3 cm.) wide film. Thusly, time of phototypesetting machine operation as cited above was even greater lengthened by use of the wider film width, which is preferable for two columnar print, than by use of the narrower film width notwithstanding the fact the canister is physically able to receive up to approximately 100 linear feet (30.5 m.) of paper film of either width as has been attained through use of this invention.

Accordingly, it is an object of this invention to provide a motorized film take-up canister that will permit a substantially greater length of film take-up without film feed jamming.

Another object of this invention is to provide such a canister whereby film already placed within the canister may be withdrawn back into the phototypesetting machine for multiple columnar printing exposure without interruption or reversal of the take-up drive.

Still another object of this invention is to provide such a canister whereby the motorized take-up drive is a simple and inexpensive device, as well as a device that can be easily installed or added on canisters already in existence and operation.

Other objects and advantages will become apparent from considering the following explanation in connection with the following drawings in which:

FIG. 1 is a perspective view of the preferred embodiment of this invention showing the motorized take-up drive mounted to one end of a canister;

FIG. 2 is a perspective end view of the canister shown in FIG. 1 looking at the canister end mounting the take-up drive.

Figure 3:
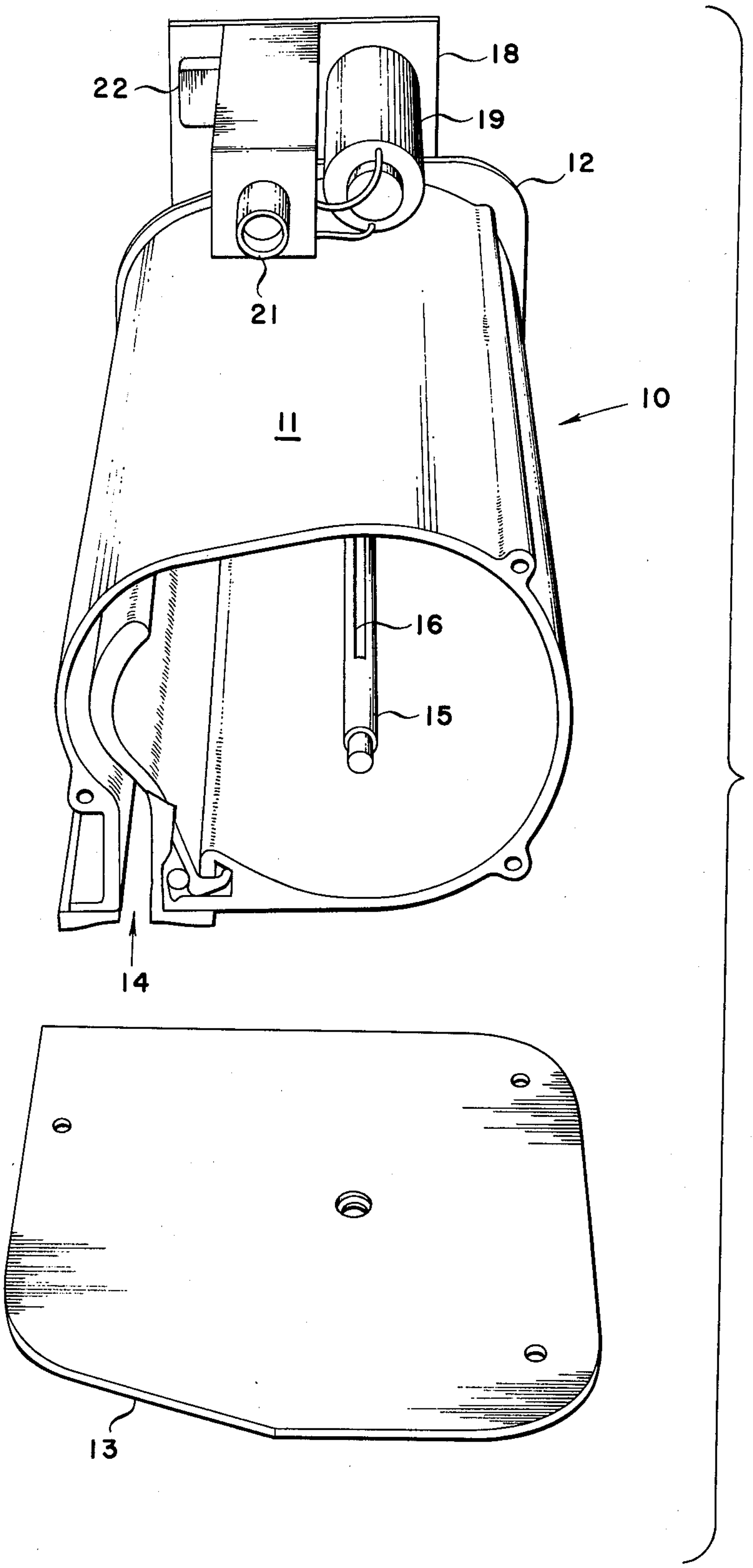
FIG. 3 is an end view of the canister shown in FIG. 1 showing the end of the canister opposite to that shown in FIG. 2 and having the end plates removed.

Referring specifically to the drawings, there is shown a canister 10 having a central body portion 11 and end plates or members 12 and 13 at opposite sides or ends thereof. A serpentine entrance path 14 is located longitudinally along the central body 11 and extending between end plates 12 and 13 for exposed film to be fed into canister 10 by the phototypesetting machine (not shown): the canister assembly 10 being configured to be mounted or located on the phototypesetting machine such that the exposed film feed outlet from the machine is in alignment or register with entrance 14. The entrance 14 is configured to provide a serpentine path to preclude light entering into the interior of canister 10 and thereby prevent light exposing damage to exposed, but as yet undeveloped, film contained in canister 10.

A shaft 15 is rotatably mounted in end plates 12 and 13 and extends therebetween longitudinally through the interior of central body 11; the connection between shaft 15 with end plates 12 and 13 being in any appropriate manner to preclude light passage through the journal or bearing. Shaft 15 contains a slot 16 adapted to receive the end of the film entering the canister through entrance 14 by a machine operator manually threading the film therein when the end plate 13 is removed as seen in FIG. 3.

The end of shaft 15 extending through end plate 12 has a pulley 17 mounted thereon external of central body 11 and end plate member 18 mounted to end plate 12. The incorporation of member 18 with end plate 12 is for the purpose of incorporating the take-up drive device of this invention to a pre-existing canister 10, and it is to be understood that before manufacture of a new canister incorporating the drive of this invention, a reconfigured end plate could be utilized to serve the functions of end plate 12 and 18 as described herein as well as modification of a pre-existing canister 10 to incorporate the drive of this invention could be accomplished by replacement of end plate 12 and end plate 18 by one reconfigured plate member serving the function of both end plate 12 and end plate 18.

A small electric motor 19 is mounted to plate 18 such that its rotor shaft extends through the plate 18 with a spindle member 20 securely mounted on the rotor shaft of motor 19 on the same side of plate 18 as pulley 17 is located. Motor 19 is operated by electric energy fed into electrical connector 21 and controlled by an on-off switch 22, both of which are mounted on plate 18. While not critical or necessary to the operation of this invention, there is shown a signal light 23 that may be incorporated in the motor control circuit to indicate to a phototypesetting machine operator whether or not the motor 19 is operating.

A continuous drive belt or means 24 is mounted to drivingly interconnect pulley 17 with spindle 20 as shown; the drive means 24 being preferably an elastomeric type O-ring that is sized so as when mounted as shown in FIGS. 1 and 2 there is insufficient tensioning of O-ring 24 such that the segments of the O-ring 24 between pulley 17 and spindle 20 retain some of the bowing as best seen in FIG. 2 rather than take on a straight line appearance that would occur if a greater amount of tension in O-ring 24 was utilized. In other words, there is a slight, but sufficient, tension in the mounting of O-ring 24 so as to permit pulley 17 to be driven by rotation of spindle 20 should pulley 17 be free to rotate to take-up film into canister 10, but on the other hand insufficient tension to preclude motor 19 and spindle 20 from rotating should spindle 17 not be free to rotate to take-up film into canister 10. Likewise, the degree of tension in O-ring 24 when mounted on pulley 17 and spindle 20 is sufficient to drive pulley 17 in a take-up direction of rotation and yet be free to rotate in the opposite direction as film is withdrawn from canister 10 back into the phototypesetting machine for multiple columnar printing without interferring with the normal rotation of spindle 20 by motor 19 when it is energized.

The size of O-ring 24 being such as to provide the small tension between pulley 17 and spindle 20 combined with the pulley being on the canister take-up shaft 15, the longitudinal smooth spindle 20 being on the rotor shaft of motor 19, and the rotary speed of motor 19 being substantially greater than the rotational speed shaft 15 will ever undergo are believed to be the critical features of this invention. By placement of O-ring 24 in the groove of pulley 17 and over the longitudinally smooth surface of the spindle 20 in the slightly tensioned manner as described above, the greater surface friction between the O-ring 24 and groove of pulley 17 as compared to that between the O-ring 24 and surface spindle 20 results in the spindle 20 being able to rotate relative to O-ring 24 and pulley 17 when the film passing from the phototypesetting machine to the canister 10 is stationary so that there is no film take-up movement in progress and the motor 19 is energized. Likewise, when the motor 19 is energized such that spindle 20 is rotating, a portion of the film located in canister 10 can be withdrawn by the retrieval or return device on the phototypesetting machine for multiple columnar printing so that spindle 20 is rotating in one direction and pulley 17 and O-ring 24 rotated in the opposite direction by the film withdrawal and again without interference with operation of motor 19.

Thus, it can be seen that, as explained above, through use of this motorized take-up drive, a greater amount of film can be taken up from a phototypesetting machine by the canister without film jamming or tearing due to the combination of the feed drive of the phototypesetting machine with the inability of the canister to freely receive the exposed film, as well as exposed film may be withdrawn from the canister back into the phototypesetting machine for multiple columnar printing without having to reverse or stop the take-up drive mechanism.

While a particular embodiment of this invention has been illustrated and described, it will be obvious to those skilled in the art that various changes and modifications may be made without departing from the invention, and it is intended to cover in the appended claims all such modifications and equivalents that fall within the true spirit and scope of this invention.

What is claimed is:

1. A drive for applying a continuous take-up tension on an elongate web extending into a take-up canister comprising in combination:

a chamber forming canister having a web entrance thereto, a pair of opposite end walls, and a rotatable shaft mounted in the end walls and extending through the chamber;

means incorporated with said shaft for connecting the web entering the canister entrance to the shaft;

a shaft rotary drive pulley means mounted to one end of said shaft external of said chamber;

an electric motor mounted proximate the container end wall said shaft rotary drive pulley means is near, said motor driving a motor rotary spindle drive means external of said chamber and spaced from said shaft rotary drive means;

and a continuous rotary drive O-ring means frictionally engaging both said shaft rotary drive pulley means and said motor rotary spindle drive means whereby rotation of said motor rotary spindle drive means by said motor can rotate said shaft through its said shaft rotary pulley drive means, said drive O-ring means sized whereby said frictional engagement of said drive O-ring means with the motor rotary spindle drive means is sufficiently small whereby said motor rotary spindle drive means may continue to rotate without rotating either the shaft or the drive O-ring means when the web is in sufficient tension to prevent web take-up onto the shaft as well as to permit said motor rotary spindle drive means to continue rotation as a portion of the web is withdrawn from the canister chamber and said shaft rotary pulley drive means is rotated in the direction opposite to that of the web take-up direction.

2. A web take-up drive as claimed in claim 1 wherein said shaft rotary pulley drive means has a greater effective circumferential diameter of the groove than the effective diameter of the spindle means.

* * * * *